United States Patent [19]

Shiozawa et al.

[11] Patent Number: 5,518,394
[45] Date of Patent: May 21, 1996

[54] INJECTION SCREW

[75] Inventors: Fumio Shiozawa; Kiyoto Takizawa; Toshimi Kato, all of Nagano, Japan

[73] Assignee: Nissei Plastic Industrial Co., Ltd., Nagano, Japan

[21] Appl. No.: 311,871

[22] Filed: Sep. 26, 1994

[30] Foreign Application Priority Data

Sep. 28, 1993 [JP] Japan .................................. 5-263088

[51] Int. Cl.$^6$ ...................................... B29C 45/23
[52] U.S. Cl. ...................... 425/562; 425/563; 425/564
[58] Field of Search ................................ 425/562, 563, 425/564

[56] References Cited

U.S. PATENT DOCUMENTS 4,512,733  4/1985  Eichlseder et al. ................ 425/562
4,678,427  7/1987  Fritzsche ............................ 425/562

Primary Examiner—Tim Heitbrink
Attorney, Agent, or Firm—Weingarten, Schurgin, Gagnebin & Hayes

[57] ABSTRACT

A penetration hole of plasticized resin is pierced in a screw head, so that the resin may be accumulated in uniform temperature distribution without sacrificing the function of the injection screw. More specifically, a penetration hole 15 of plasticized resin is pierced inside a screw head 13 at the front end of a screw 12 from the front middle to the rear periphery so as to communicate between the screw peripheral parts and the screw head front space. A ring valve 17 for opening and closing a rear opening 15a of the penetration hole 15, and closing the gap around the screw head is fitted to the rear periphery of the screw head 13 so as to be free to move back and forth.

1 Claim, 2 Drawing Sheets

//<br>

INJECTION SCREW

BACKGROUND OF THE INVENTION

1. Field of the Invention

The present invention relates to an injection screw to be provided in an injection heating tube of an inline screw type injection apparatus.

2. Background Art

FIG. 3 shows an injection screw having a check valve of a common conventional structure. This injection screw has a screw head 3 attached to the front end of a screw disposed in an injection heating tube 1 to be free to rotate and move back and forth, and a ring valve 4 for preventing counterflow of fused resin at the time of injection is fitted around the rear part of the screw head 3.

FIG. 4 shows a structure in which a penetration hole 5 of plasticized resin is pierced inside of a screw head 3 from the front periphery to the rear periphery, and a ball check 6 is provided in the penetration hole 5 to prevent counterflow of fused resin at the time of injection.

In the conventional structure, when the material resin is weighed by rotating the screw 2, the granular resin is fused and kneaded by the heat from a heater (not shown) provided around the injection tube 1 and the screw 2, and sent out ahead of the screw, and in the structure in FIG. 3, the plasticized resin 7 passes through the gap between the screw head 3 and ring valve 4, and is sequentially accumulated in the front part of the injection heating tube 1 from around the screw head.

In the structure in FIG. 4, the fused and kneaded resin pushes to open the ball check 6 to enter the penetration hole 5, and is sequentially accumulated in the front part of the injection heating tube 1 from the opening around the screw head.

To weigh the material resin, the screw is moved back by the pressure of the resin 7 accumulated in the front part of the injection heating tube 1, and the plasticized resin 7 is sequentially accumulated from around the screw head as indicated by chain line. The temperature of the accumulated fused resin tends to be higher in the peripheral parts always exposed to heating from the injection heating tube side than in the middle parts less exposed to external heat, and in addition, as the new plasticized resin is sent from around the screw head in the peripheral parts and the thermal conductivity of the resin itself is poor, a further temperature difference occurs between the resin previously collected in the central parts and the resin in the peripheral parts, which causes temperature non-uniformity and molding instability, thereby adversely affecting the molded products.

The invention is devised to solve the problem of temperature non-uniformity of the resin, and it is hence a primary object thereof to present an injection screw of a novel constitution capable of accumulating the resin in more uniform temperature distribution than in the prior art by improving the screw head, without sacrificing the function of the conventional injection screw.

SUMMARY OF THE INVENTION

To achieve the object, the invention presents an injection screw characterized by piercing a penetration hole of plasticized resin from the front middle to the rear periphery, inside a screw head at the front end of a screw, so as to communicate between the screw periphery and screw head front space, and fitting a ring valve for opening and closing the rear opening of the penetration hole and closing the gap in the screw head periphery, in the rear periphery of the screw head so as to be free to move back and forth.

In this constitution, the plasticized resin is accumulated in the front part of the injection heating tube from the middle of the screw head through the penetration hole, and the resin flows from the middle to the periphery, and the peripheral parts are heated by the injection heating tube, and therefore the temperature difference between the middle and the periphery is very small, so that the temperature distribution is uniform on the whole.

DETAILED DESCRIPTION OF THE PREFERRED EMBODIMENTS

Figure 1:
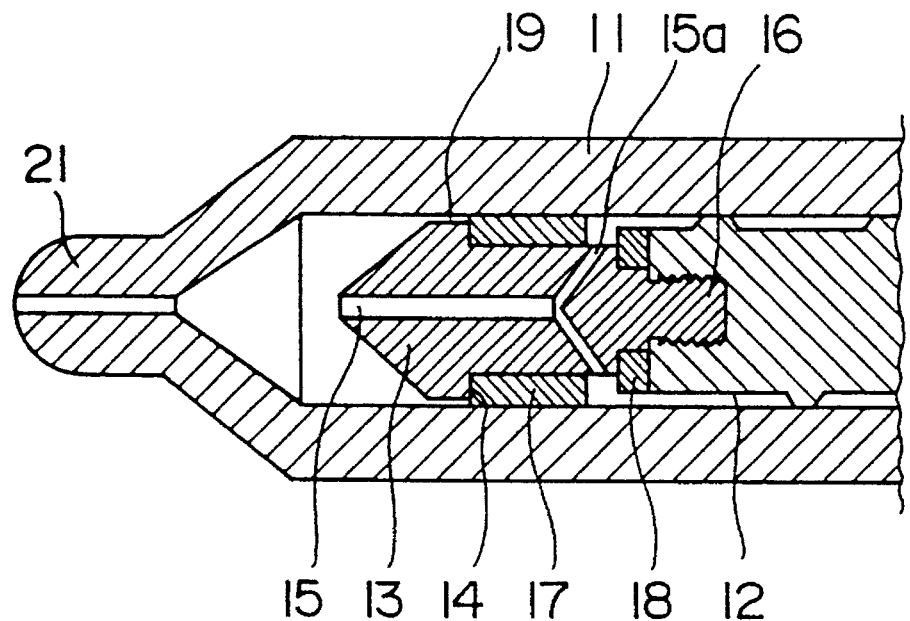
FIG. 1 is a longitudinal sectional view of essential parts in a state of internal installation of an injection screw of the present invention in an injection heating tube.
Figure 2:
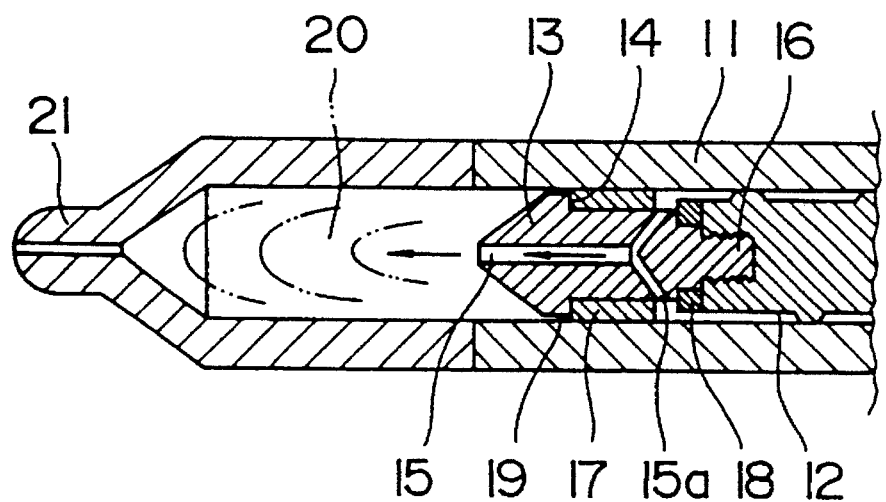
FIG. 2 is a longitudinal sectional view of essential parts explaining the resin accumulated state of the same.
Figure 3:
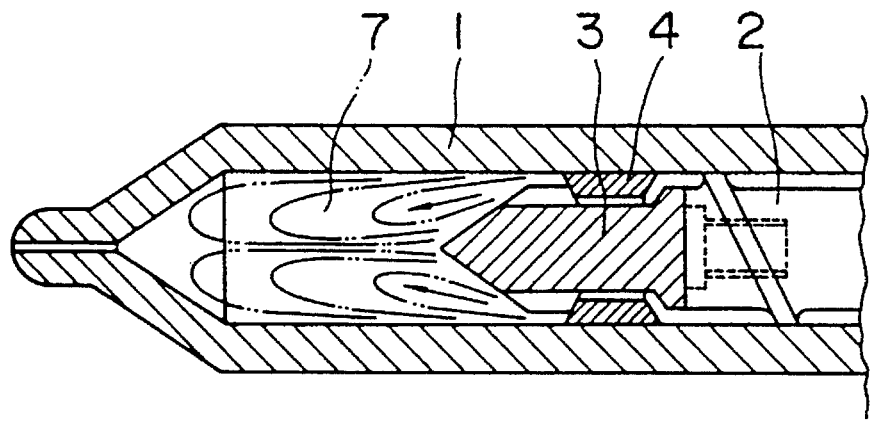
FIG. 3 is a longitudinal sectional view of essential parts in a state of internal installation of a conventional injection screw in an injection heating tube.
Figure 4:
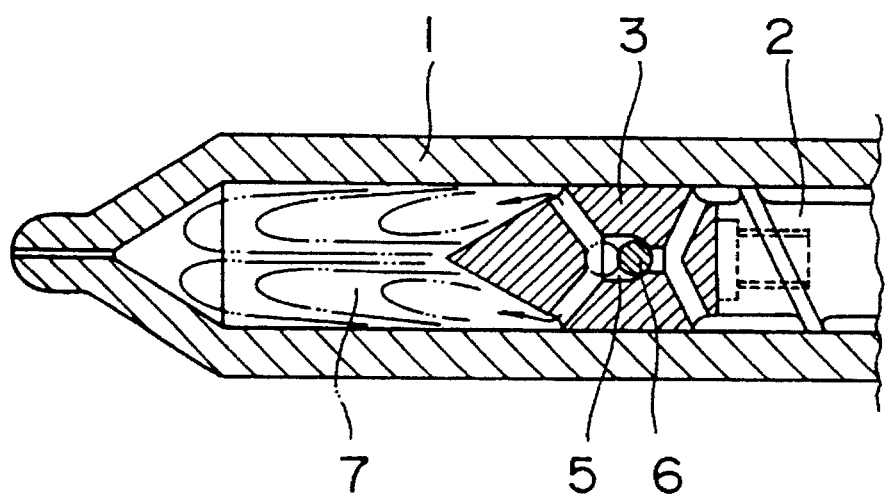
FIG. 4 is a longitudinal sectional view of essential parts in a state of internal installation of a different conventional injection screw in an injection heating tube.

FIG. 1 and FIG. 2 show an embodiment of the invention, in which reference numeral 11 denotes an injection heating tube omitting a heater on an external periphery, 12 is a screw provided inside the injection heating tube so as to be free to rotate and move back and forth, and 13 is a screw head consisting of a front part formed conically and a rear part formed in a smaller diameter than the front part with a step 14 provided on the outer periphery, and a penetration hole 15 of resin is pierced inside from the front middle to the rear periphery. The aperture of this penetration hole 15 varies with the type of material resin.

At the rear end, a screw shaft 16 is projecting, and a ring valve 17 is fitted around the rear end so as to be movable back and forth. This ring valve 17 serves as both an opening and closing member of a rear opening 15a of the penetration hole 15 and a closure member of a gap 19 around the screw head.

Such screw head 13 is installed by driving the screw shaft 16 into the front end of the screw 12 having a sheet ring 18, thereby constituting an injection screw together with the screw 12. By this injection screw, same as in the prior art, a granular resin is plasticized by the rotation of the screw 12, and the resin is sent forward to the front part of the screw.

The resin reaching the rear part of the screw head 13 pushes the ring valve 17 which closes the gap 19 in the rear periphery of the injection heating tube 11 and screw head 13 to move until contacting with the step 14, thereby opening the rear opening of the penetration hole 15. As a result, the screw periphery and screw head front part communicate with each other, and the resin flows into the penetration hole 15, and is collected in the front part of the injection heating tube 11 from the middle of the screw head 13.

This resin 20 is collected from the middle parts to the peripheral parts as indicated by chain line, and therefore the resin is sequentially accumulated in the middle parts, while the peripheral parts are heated by the injection heating tube 11, and therefore the temperature difference between the middle parts and peripheral parts is very small, and the resin temperature at the end of weighing is uniform on the whole.

When the screw 12 is moved forth after weighing, the accumulated resin 19 is pushed by the screw head 13, and is injected from a nozzle 21 at the front end. At this time, by the resin pressure the front part receives, the ring valve 17 is pushed back to the sheet ring 18 to close the rear opening 15a of the penetration hole 15, thereby preventing counterflow of the weighed resin.

According to the invention, as described herein, since the penetration hole 5 of the plasticized resin is pierced inside the screw head 13 at the front end of the screw from the front end middle to the rear end periphery so as to communicate between the screw periphery and the screw front space, and the ring valve 17 for opening and closing the rear opening 5a of the penetration hole 5 and closing the gap in the screw head periphery is fitted around the rear part of the screw head in a manner free to move back and forth, thereby allowing the plasticized resin to flow out from the front middle part of the screw head 13 to be accumulated, unlike the case of accumulating the resin from the surroundings of the screw head, uneven temperature does not occur, and the resin temperature is uniform regardless of the duration of weighing time, and instability of molding due to uneven temperature distribution is avoided, so that the quality of molded products may be enhanced.

Structurally, no particular means is needed in the screw and other parts except for piercing a penetration hole in the screw head, and therefore the novel constitution may be directly applied in the existing injection apparatus.

What is claimed is:

1. An injection screw comprising:

an injection tube;

a screw disposed within the injection tube;

a screw head attached to said screw, the screw head having a penetration hole extending from a front middle of the screw head to a rear periphery of the screw head, the penetration hole having a front opening and a rear opening, the screw head positioned in the injection tube to have a gap between the screw head and the injection tube; and a ring valve disposed around the screw head for opening and closing the rear opening of the penetration hole and for closing the gap between the screw head and the injection tube.

* * * * *